United States Patent [19]

Strauss

[11] 4,349,845

[45] Sep. 14, 1982

[54] CONTROL PANEL COVER FOR PROJECTION TELEVISION RECEIVER

[75] Inventor: Paul Strauss, Chicago, Ill.

[73] Assignee: Zenith Radio Corporation, Glenview, Ill.

[21] Appl. No.: 259,333

[22] Filed: Apr. 30, 1981

[51] Int. Cl.³ .............................................. H04N 5/64
[52] U.S. Cl. .................................... 358/254; 358/237; 312/7.1; D14/77
[58] Field of Search ................. 358/254, 60, 231, 237; 312/7 TV, 7.1, 7.2; D14/77, 81–83

[56] References Cited

U.S. PATENT DOCUMENTS 2,476,494  7/1949  Jones et al. .......................... 358/254
2,737,649  3/1956  Pifer ..................................... 358/254

Primary Examiner—Robert L. Griffin
Assistant Examiner—Edward L. Coles
Attorney, Agent, or Firm—Ralph E. Clarke, Jr.

[57] ABSTRACT

A control panel cover assembly for use in an ultra-compact, jack-in-the-box, rear-projection television receiver. The receiver is housed in an open-topped cabinet having lid means pivotally attached at the back thereof for selectively opening and closing the cabinet providing for emergence and storage of an elevatable unitary optical assembly including a rear-projection screen. The unitary optical assembly includes rigid, box-like shroud means. The receiver has a widthwise-oriented control panel means located inwardly adjacent to the top section of the front panel of the receiver. The control panel cover assembly according to the invention comprises an outwardly swinging cover member which is attached to the lid at the front thereof by at least one inwardly-spring-biased hinge. The front panel of the receiver has a recess adjacent to the control panel for receiving the cover member. As the unitary optical assembly is elevated from the cabinet the lid is urged upwardly, raising the control panel cover member from the recess and uncovering the control panel. When the unitary optical assembly is lowered into the cabinet the lid is lowered and the control panel cover member swings downwardly and inwardly for re-entering the recess and covering the control panel.

1 Claim, 8 Drawing Figures

CONTROL PANEL COVER FOR PROJECTION TELEVISION RECEIVER

CROSS-REFERENCE TO RELATED APPLICATIONS

This application is related to but in no way dependent upon copending applications of common ownership herewith including: Ser. No. 228,434 filed Jan. 26, 1981; Ser. No. 238,861 filed Feb. 27, 1981; and Ser. No. 235,059 filed Feb. 17, 1981.

BACKGROUND OF THE INVENTION AND PRIOR ART DISCLOSURES

This invention concerns television systems, and is particularly directed to a system in which a rear projection screen, storable in the system cabinet, is elevatable for viewing.

A system of this type is described and fully claimed in referent copending application Ser. No. 228,434. A jack-in-the-box projection television receiver comprises cabinet means for enclosing the components of the receiver, and includes lid means hinged at the back of the cabinet. The receiver comprises vertically arranged, elevatable rear projection screen means selectively storable in the cabinet. Image source means provides for forming a television image. Stationary projection means provide for projecting an aerial image of a television image formed by the image source means along a folded optical path onto the screen means when the optical path is erected and the screen means is located a predetermined image projection distance from the source means. The receiver further includes means for elevating the screen from a first receiver-inoperable position wherein the screen means is completely enclosed within the cabinet and the receiver is ultra-compact, to an elevated receiver-operable position wherein the screen means is emerged from the cabinet. As a result, the optical path is extended to a length equal to the predetermined image projection distance whereby the projection image is coincident with the screen.

OBJECT OF THE INVENTION

It is an object of the invention to provide control panel cover means for a jack-in-the-box projection television receiver.

It is another object of this invention to provide control panel cover means for a projection television receiver of the type wherein a rear-projection screen is storable in and elevatable from a cabinet of the receiver.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings, in which:

DESCRIPTION OF THE PREFERRED EMBODIMENT

Figure 1A:
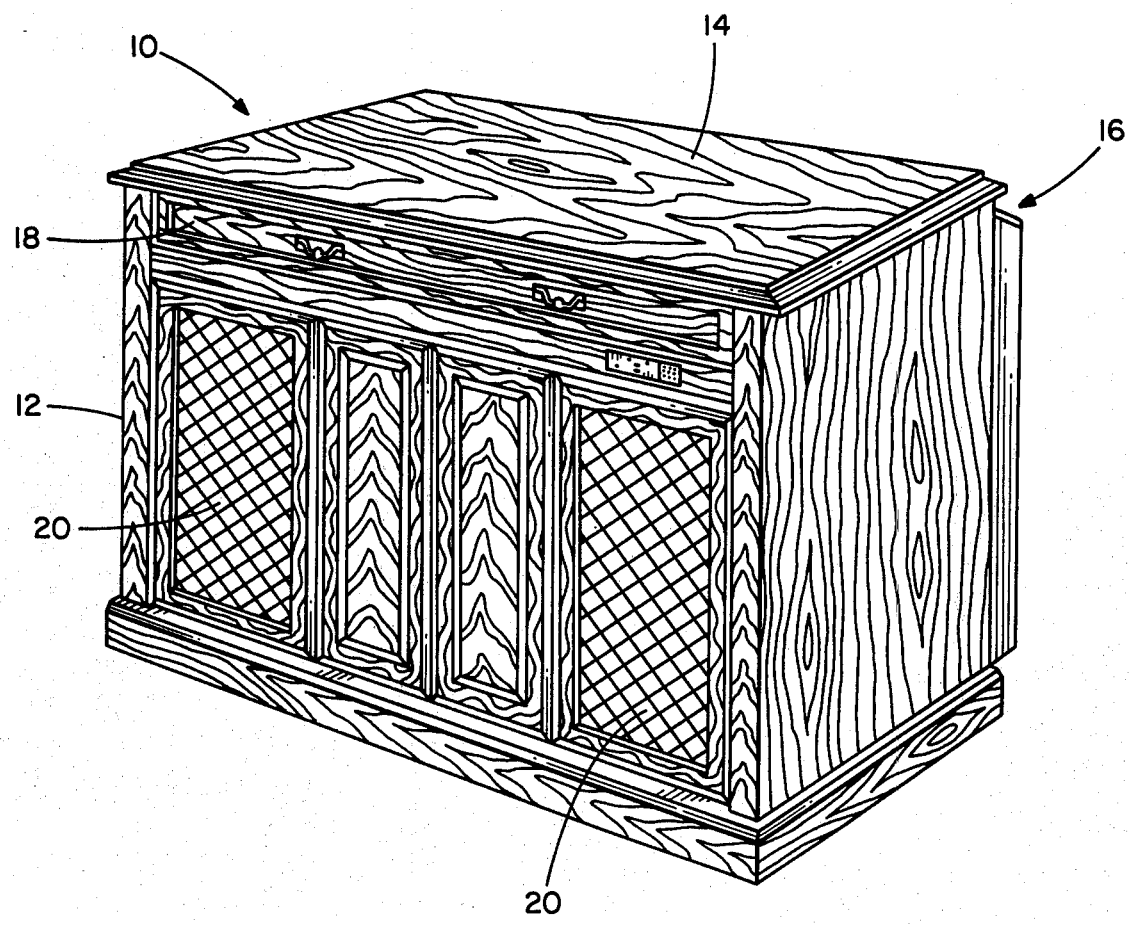
FIGS. 1A and 1B are oblique views in perspective of a projection television receiver according to the invention described and claimed in referent copending application Ser. No. 228,434. There is depicted, respectively, a first, receiver-inoperable position; and a second, receiver-operable position wherein a rear projection screen is elevated from the receiver cabinet for viewing.
Figure 1B:
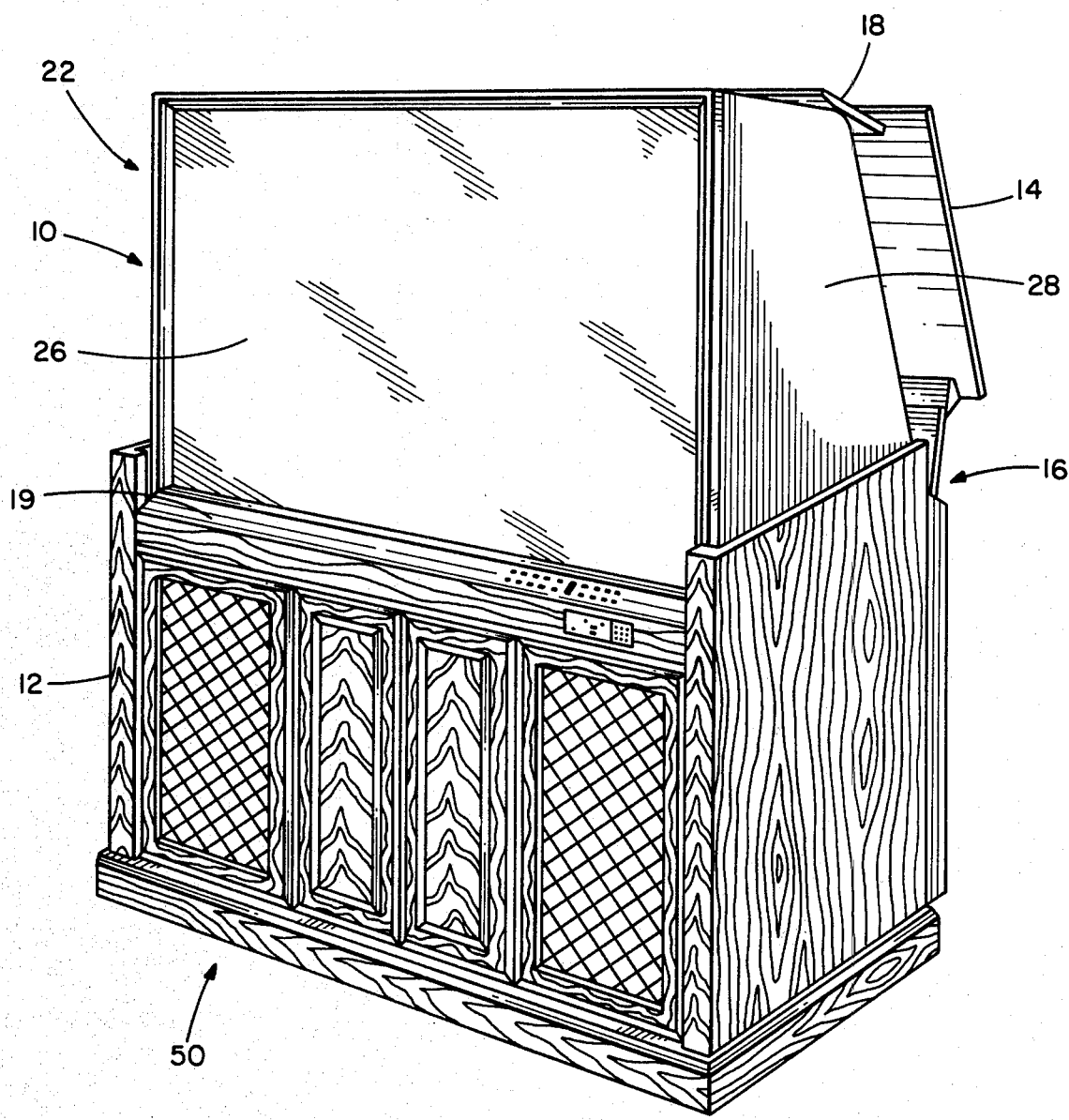

An ultra-compact jack-in-the-box rear-projection television receiver 10 according to the invention disclosed in referent copending application Ser. No. 228,434 is shown by FIGS. 1A and 1B. The receiver comprises an open-topped cabinet 12 for housing the components of the receiver. Cabinet 12 includes lid means 14 pivotally attached at the back of the cabinet for selectively opening and closing cabinet 12. The pivotal attachment may comprise at least one hinge 16 such as a piano hinge, for example. The lid 14 has a control panel cover member 18 according to a preferred embodiment of the invention which provides for covering a receiver control panel 19. Grilled aperture ports 20 provide for audio emission from concealed speakers of a stereo sound system, for example.

Figure 2:
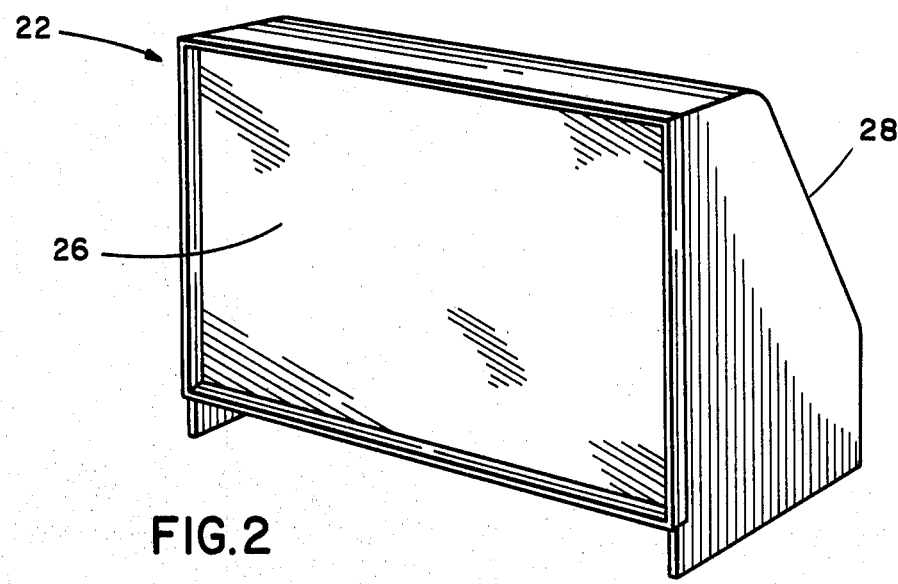
FIG. 2 is a front oblique view in perspective showing additional details of the component elevatable from the cabinet shown by FIGS. 1A and 1B.

With reference to FIG. 1B, a unitary optical assembly means 22 is selectively storable in cabinet 12, and elevatable therefrom, as depicted. With reference also to FIG. 2, the unitary optical assembly 22 includes rear projection screen means 26 for displaying a television image upon emergence as projected by internal optical components of the receiver 10 (not shown). the unitary optical assembly further includes rigid, box-like shroud means 28, which has closed sides and a closed top, as shown. Shroud 28 provides for supporting screen 26 on the front thereof and in a predetermined fixed relationship with projection optical components of receiver 10, when screen 26 is elevated from cabinet 12. The unitary optical assembly is fully described and claimed in referent copending application Ser. No. 238,861. The selective opening and closing of cabinet 12 through lid means 14 provides for emergence and storage of the unitary optical assembly 22.

Figure 3:
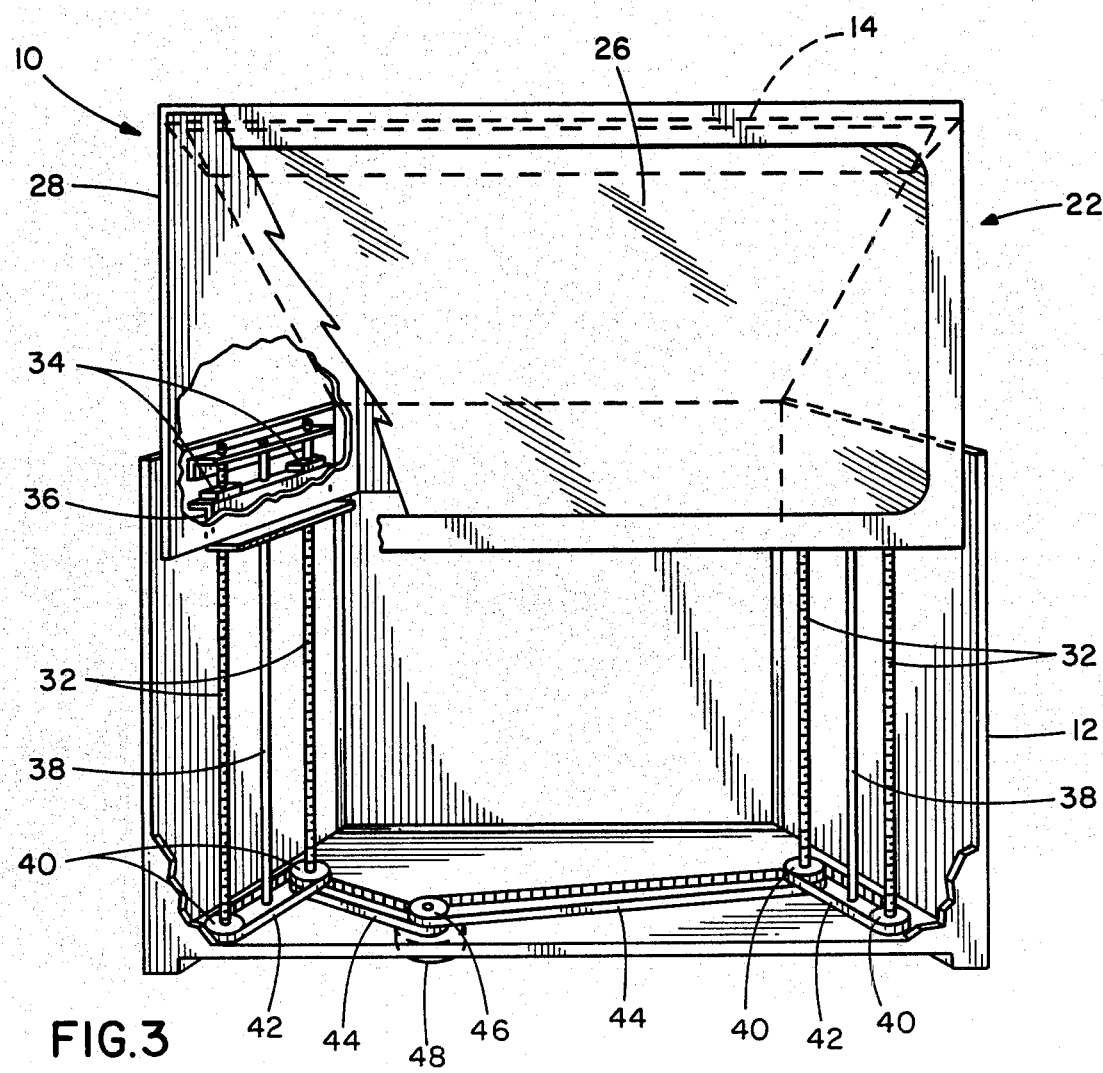
FIG. 3 is a perspective view of projection television receiver with a cabinet front and viewing screen cut away to show details of the means for elevating and lowering the elevatable component shown by FIG. 2.

FIG. 3 depicts means for lifting lid 14 (indicated by the dash lines) and elevating unitary optical assembly 22 from a first, receiver-inoperable position wherein screen 26 is stored in cabinet 12, to a second receiver-operable position wherein screen 26 is emerged from cabinet 12. Four vertically oriented and vertically stabilized screw means 32, for example, are shown as providing for elevating and lowering screen 26. Shroud 28 is shown as cut away in the left-hand side of FIG. 3 to show details of the elevating means; an identical mirror-image assembly is located on the opposite side of the cabinet 12, but obscured by screen 26 and shroud 28.

The rotation of screw means 32 is translated into vertical movement by screw follower means 34 attached to bracket 36, to which shroud 28 is in turn attached. Guide rods 38 provide for vertically stabilizing shroud 28 in its vertical traverse. Screen 26 is depicted as being in its raised position.

Screw means 32 are caused to rotate in unison by power train means indicated as comprising screw means drive pulleys 40 which are caused to rotate in unison by drive pulley link belts 42. Drive pulleys 40 are in turn linked by belts 44 to drive pulleys 46 which are rotated by a reversible electrical motor 48, which provides for both elevating and lowering lid 14 and unitary optical assembly 22. Belts 42 and 44 are depicted as being of the synchronous type for mating with synchronous pulleys 40 and 46, providing positive drive. The precision elevating means are fully described and claimed in the referent copending application Ser. No. 235,059.

Control panel 19 will be noted as being widthwise-oriented with respect to cabinet 12, and located inwardly adjacent to the top section of the front panel 50 of receiver 10. The control panel cover assembly according to a preferred embodiment of the invention comprises the following components. FIGS. 4A–4D show sequentially the excursion of the control panel member 18 during the elevating and lowering of the unitary optical assembly 22 and associated rear-projection screen 26.

Figure 4A:
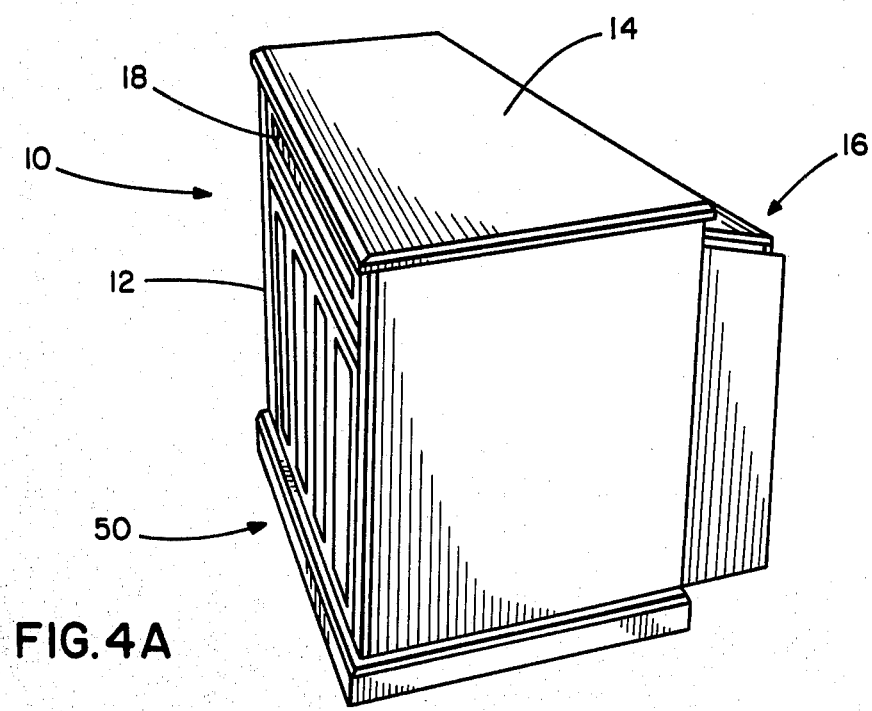
FIGS. 4A–4D comprises a series of oblique views in perspective showing sequentially the excursion of a preferred embodiment of a control panel cover member according to the invention during elevation and lowering of the viewing screen.
Figure 4B:
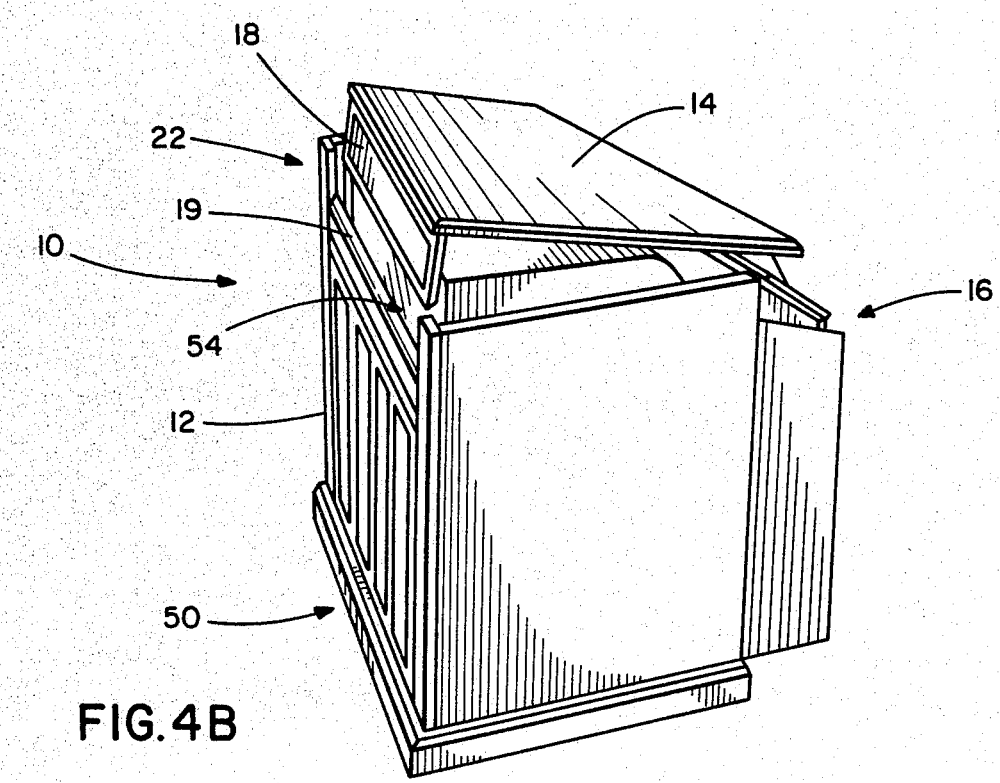
Figure 4C:
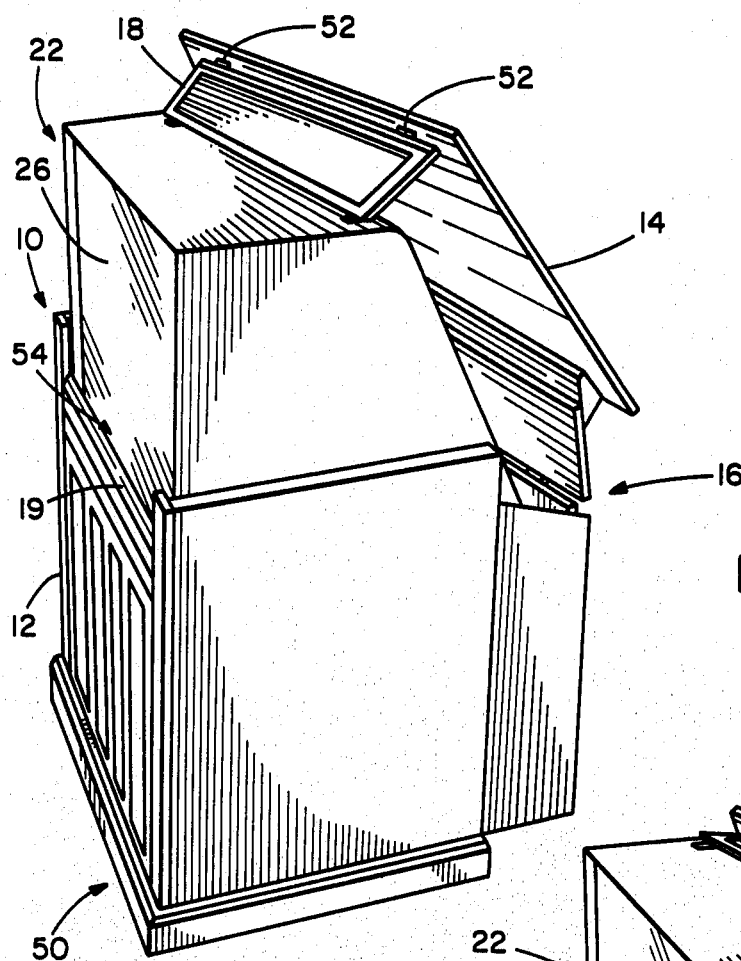
Figure 4D:
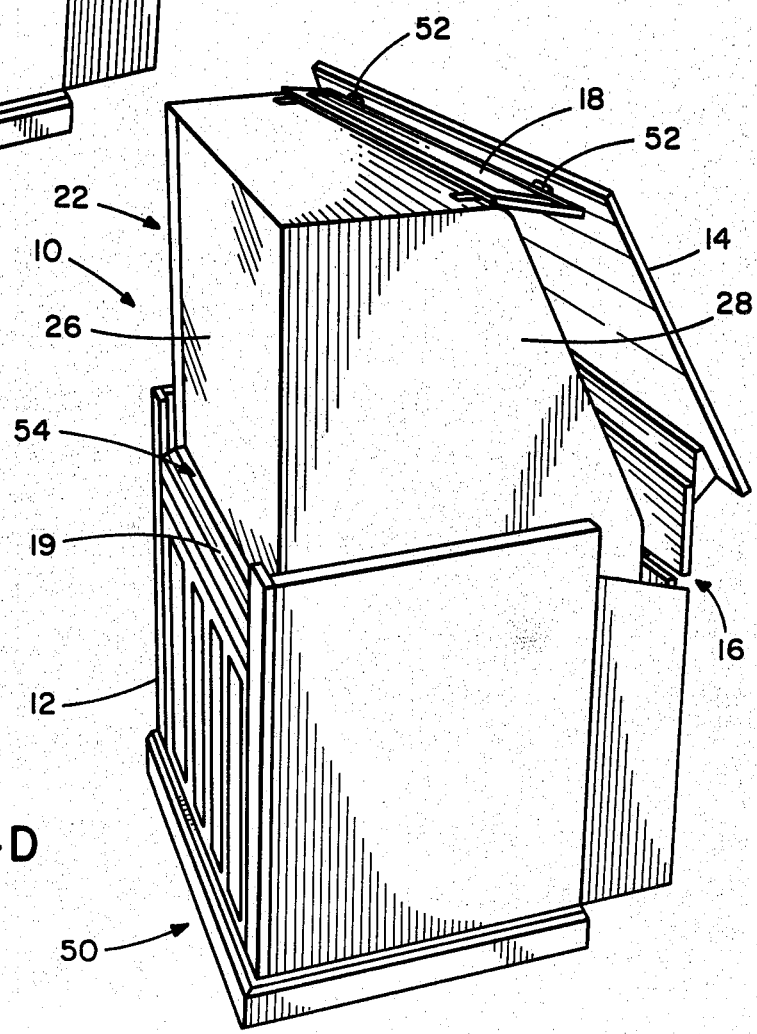

Control panel cover member 18 is shown as being attached to lid means 14 at the front thereof, and is outwardly swinging, as indicated by FIGS. 4B, 4C and 4D. The outward swinging is provided by at least one inwardly-spring-biased hinge means, depicted as being two such hinge means 52 in this embodiment of the invention. Hinges 52 are attached as indicated. The hinges 52 may be of the type provided by Weber-Knapp Company, Jamestown, N.Y., under the designation Part No. 12749. A hinge from another source having equivalent performance characteristics may as well be used.

Front panel means 50 is shown as having recess means 54 adjacent to the control panel 19 for receiving control panel cover member 18, as depicted by FIG. 4A.

The effect is such that as the unitary optical assembly 22 is elevated from cabinet 12 by the aforedescribed elevating means, lid 14 is urged upwardly, as depicted in FIGS. 4B and 4C. Control panel cover member 18 is raised from recess 54, uncovering control panel 19. Hinges 52 provide for the outward swinging of the control panel cover member 18 effective to cause the cover member 18 to ride up and outwardly on shroud 28 as shroud 28 emerges from cabinet 12. FIG. 4D depicts the configuration of the lid 14 and cover member 18 when the unitary optical assembly 22 is fully emerged from cabinet 12.

As cabinet 12 is closed, the effect is such that as the unitary optical assembly 22 is lowered into cabinet 12 by the reverse operation of the aforedescribed elevating means, lid 14 is lowered and control panel cover member 18 moves downwardly and inwardly for re-entering recess 54 and covering control panel 19, as depicted. The final cabinet configuration is as shown by FIG. 4A. The inward spring bias of the hinges 52 are required to provide positive closing by control panel cover member 18 so that the cover member is flush with adjacent sections of the cabinet 12.

Exemplary dimensional height (H), width (W) and depth (D) values of the cabinet 12 of the projection television receiver 10 are listed as follows. It is to be recognized that the values are by way of example only, and are intended to be in no way limiting. Dimensions are in inches.

Cabinet (12)
Screen stored: 31H × 44W × 19.5D
Height, screen elevated: 58
Lid (14)
44W × 20D
Control Panel Cover member (18)
6H × 38W
Recess (54)
6H × 38.5W
Unitary Optical Assembly (22)
Shroud (28)
22H × 40W
Depth, at top: 12
Depth, at bottom: 23.5
Screen (26)
Diagonal Measure: 45
Total vertical reciprocation: about 24

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A control panel cover assembly for use in an ultra-compact, jack-in-the-box rear-projection television receiver housed in an open-topped cabinet having lid means pivotally attached at the back thereof for selectively opening and closing said cabinet for emergence and storage of an elevatable unitary optical assembly including rear projection screen means for displaying a television image upon said emergence, said unitary optical assembly including rigid, box-like shroud means for supporting said viewing screen on the front thereof, said receiver including widthwise-oriented control panel means located inwardly adjacent to the top section of a front panel of said receiver, said control panel cover assembly comprising:

an outwardly swinging control panel cover member for covering said control panel, said cover member being attached to said lid means at the front thereof by at least one inwardly-spring-biased hinge means;

front panel means having recess means adjacent to said control panel means for receiving said control panel cover member;

such that as said unitary optical assembly means is elevated from said cabinet, said lid means is urged upwardly, raising said control panel cover member from said recess and uncovering said control panel, said hinge means providing for the outward swinging of said cover member effective to cause said member to ride up and outwardly on said shroud means as said shroud emerges, and such that when said unitary optical assembly is lowered into said cabinet control panel, said lid means is lowered and said cover member swings downwardly and inwardly for re-entering said recess means and covering said control panel.

* * * * *